(12) United States Patent
McAuley et al.

(10) Patent No.: US 11,707,687 B1
(45) Date of Patent: Jul. 25, 2023

(54) SYSTEMS AND METHODS FOR ADMINISTERING A PREDICTION GAME

(71) Applicant: Hubstar, Inc., Hingham, MA (US)

(72) Inventors: Thomas A. McAuley, Austin, TX (US); Darren M. Kimura, Redwood City, CA (US); Benjamin Yenter, Edmonds, WA (US); Jason R. Nako, Portland, OR (US); Mark Brenner, Summit, NJ (US)

(73) Assignee: Hubstar, Inc., Hingham, MA (US)

( * ) Notice: Subject to any disclaimer, the term of this patent is extended or adjusted under 35 U.S.C. 154(b) by 0 days.

(21) Appl. No.: 17/005,450

(22) Filed: Aug. 28, 2020

Related U.S. Application Data

(63) Continuation of application No. 15/893,802, filed on Feb. 12, 2018, now abandoned, which is a continuation of application No. 15/191,059, filed on Jun. 23, 2016, now Pat. No. 9,908,055, which is a continuation of application No. 14/657,631, filed on Mar. 13, 2015, now Pat. No. 9,399,173.

(60) Provisional application No. 61/952,443, filed on Mar. 13, 2014.

(51) Int. Cl.
*G07F 17/32* (2006.01)
*A63F 13/828* (2014.01)
*A63F 13/46* (2014.01)
*A63F 13/537* (2014.01)

(52) U.S. Cl.
CPC .......... *A63F 13/828* (2014.09); *A63F 13/46* (2014.09); *A63F 13/537* (2014.09)

(58) Field of Classification Search
CPC ...................................................... G07F 17/32
See application file for complete search history.

(56) References Cited

U.S. PATENT DOCUMENTS

| | | | |
|---|---|---|---|
| 2002/0068633 A1* | 6/2002 | Schlaifer | G07F 17/3244 463/43 |
| 2002/0107590 A1 | 8/2002 | Liegey | |
| 2006/0183548 A1* | 8/2006 | Morris et al. | G07F 17/32 463/42 |
| 2008/0274782 A1 | 11/2008 | Schmidt | |
| 2009/0023495 A1* | 1/2009 | Koustas et al. | G07F 17/32 463/43 |
| 2009/0186679 A1* | 7/2009 | Irvine et al. | G07F 17/32 463/16 |
| 2010/0210330 A1* | 8/2010 | Fleming | G07F 17/32 463/2 |
| 2011/0256913 A1* | 10/2011 | Ford | G07F 17/32 463/6 |

\* cited by examiner

*Primary Examiner* — Omkar A Deodhar
(74) *Attorney, Agent, or Firm* — Hsuanyeh Law Group P.C.

(57) ABSTRACT

In a prediction game, the potential value of a participant's prediction depends on the time when the prediction is submitted. The prediction may pertain to the outcome of a competition in a bracket-style tournament (e.g., the NCAA Division I Men's Basketball Championship, or "March Madness").

6 Claims, 9 Drawing Sheets

300

|     |      | C1          | C2     | C3     | C4     | C5     | C6       | C7     | C8     | C9     | C10    |
|-----|------|-------------|--------|--------|--------|--------|----------|--------|--------|--------|--------|
| R1  |      | Pre Tourney | 1st TO | 2nd TO | 3rd TO | 4th TO | Halftime | 5th TO | 6th TO | 7th TO | 8th TO |
| R2  | RD 1 | 30          | 27     | 26     | 25     | 24     | 23       | 22     | 21     | 20     | 19     |
| R3  | RD 2 | 60          |        |        |        |        |          |        |        |        |        |
| R4  | RD 3 | 120         |        |        |        |        |          |        |        |        |        |
| R5  | RD 4 | 240         |        |        |        |        |          |        |        |        |        |
| R6  | RD 5 | 480         |        |        |        |        |          |        |        |        |        |
| R7  | RD 6 | 960         |        |        |        |        |          |        |        |        |        |
| R8  |      | 1890        |        |        |        |        |          |        |        |        |        |
| R9  |      |             |        |        |        |        |          |        |        |        |        |
| R10 |      | Pre Round 2 | 1st TO | 2nd TO | 3rd TO | 4th TO | Halftime | 5th TO | 6th TO | 7th TO | 8th TO |
| R11 | RD 2 | 48          | 45     | 43     | 41     | 39     | 37       | 35     | 33     | 31     | 29     |
| R12 | RD 3 | 96          |        |        |        |        |          |        |        |        |        |
| R13 | RD 4 | 192         |        |        |        |        |          |        |        |        |        |
| R14 | RD 5 | 384         |        |        |        |        |          |        |        |        |        |
| R15 | RD 6 | 768         |        |        |        |        |          |        |        |        |        |
| R16 |      | 1488        |        |        |        |        |          |        |        |        |        |
| R17 |      |             |        |        |        |        |          |        |        |        |        |
| R18 |      | Pre Round 3 | 1st TO | 2nd TO | 3rd TO | 4th TO | Halftime | 5th TO | 6th TO | 7th TO | 8th TO |
| R19 | RD 3 | 76          | 71     | 67     | 63     | 59     | 55       | 51     | 47     | 43     | 39     |
| R20 | RD 4 | 152         |        |        |        |        |          |        |        |        |        |
| R21 | RD 5 | 304         |        |        |        |        |          |        |        |        |        |
| R22 | RD 6 | 608         |        |        |        |        |          |        |        |        |        |
| R23 |      | 1140        |        |        |        |        |          |        |        |        |        |
| R24 |      |             |        |        |        |        |          |        |        |        |        |
| R25 |      | Pre Round 4 | 1st TO | 2nd TO | 3rd TO | 4th TO | Halftime | 5th TO | 6th TO | 7th TO | 8th TO |
| R26 | RD 4 | 111         | 107    | 103    | 99     | 95     | 91       | 87     | 83     | 79     | 75     |
| R27 | RD 5 | 222         |        |        |        |        |          |        |        |        |        |
| R28 | RD 6 | 444         |        |        |        |        |          |        |        |        |        |
| R29 |      | 777         |        |        |        |        |          |        |        |        |        |
| R30 |      |             |        |        |        |        |          |        |        |        |        |
| R31 |      | Pre Round 5 | 1st TO | 2nd TO | 3rd TO | 4th TO | Halftime | 5th TO | 6th TO | 7th TO | 8th TO |
| R32 | RD 5 | 182         | 178    | 174    | 170    | 166    | 162      | 158    | 154    | 150    | 146    |
| R33 | RD 6 | 364         |        |        |        |        |          |        |        |        |        |
| R34 |      | 546         |        |        |        |        |          |        |        |        |        |
| R35 |      |             |        |        |        |        |          |        |        |        |        |
| R36 |      | Pre Round 6 | 1st TO | 2nd TO | 3rd TO | 4th TO | Halftime | 5th TO | 6th TO | 7th TO | 8th TO |
| R37 | RD 6 | 322         | 318    | 314    | 310    | 306    | 302      | 298    | 294    | 290    | 286    |
| R38 |      | 322         |        |        |        |        |          |        |        |        |        |

| | | C1 | C2 | C3 | C4 | C5 | C6 | C7 | C8 | C9 | C10 |
|---|---|---|---|---|---|---|---|---|---|---|---|
| R1 | | Pre Tourney | 1st TO | 2nd TO | 3rd TO | 4th TO | Halftime | 5th TO | 6th TO | 7th TO | 8th TO |
| R2 | RD 1 Only | 30 | 28 | 27 | 24 | 21 | 18 | 14 | 9 | 5 | 2 |
| R3 | | | | | | | | | | | |
| R4 | RD 1 (RD 1+2) | 30 | 27 | 25 | 23 | 20 | 17 | 13 | 8 | 4 | 1 |
| R5 | RD 2 (RD 1+2) | 60 | 55 | 55 | 55 | 55 | 55 | 55 | 55 | 55 | 55 |
| R6 | | | | | | | | | | | |
| R7 | RD 1 (RD 1-3) | 30 | 22 | 20 | 19 | 16 | 14 | 10 | 7 | 3 | 1 |
| R8 | RD 2 (RD 1-3) | 60 | 46 | 46 | 46 | 46 | 46 | 46 | 46 | 46 | 46 |
| R9 | RD 3 (RD 1-3) | 120 | 92 | 92 | 92 | 92 | 92 | 92 | 92 | 92 | 92 |
| R10 | | | | | | | | | | | |
| R11 | RD 1 (RD 1-4) | 30 | 15 | 14 | 13 | 11 | 9 | 7 | 5 | 2 | 1 |
| R12 | RD 2 (RD 1-4) | 60 | 31 | 31 | 31 | 31 | 31 | 31 | 31 | 31 | 31 |
| R13 | RD 3 (RD 1-4) | 120 | 62 | 62 | 62 | 62 | 62 | 62 | 62 | 62 | 62 |
| R14 | RD 4 (RD 1-4) | 240 | 124 | 124 | 124 | 124 | 124 | 124 | 124 | 124 | 124 |
| R15 | | | | | | | | | | | |
| R16 | RD 1 (RD 1-5) | 30 | 7 | 7 | 6 | 5 | 4 | 3 | 2 | 1 | 0 |
| R17 | RD 2 (RD 1-5) | 60 | 15 | 15 | 15 | 15 | 15 | 15 | 15 | 15 | 15 |
| R18 | RD 3 (RD 1-5) | 120 | 30 | 30 | 30 | 30 | 30 | 30 | 30 | 30 | 30 |
| R19 | RD 4 (RD 1-5) | 240 | 60 | 60 | 60 | 60 | 60 | 60 | 60 | 60 | 60 |
| R20 | RD 5 (RD 1 -5) | 480 | 120 | 120 | 120 | 120 | 120 | 120 | 120 | 120 | 120 |
| R21 | | | | | | | | | | | |
| R22 | RD 1 (RD 1-6) | 30 | 1 | 1 | 1 | 1 | 1 | 1 | 0 | 0 | 0 |
| R23 | RD 2 (RD 1-6) | 60 | 3 | 3 | 3 | 3 | 3 | 3 | 3 | 3 | 3 |
| R24 | RD 3 (RD 1-6) | 120 | 6 | 6 | 6 | 6 | 6 | 6 | 6 | 6 | 6 |
| R25 | RD 4 (RD 1-6) | 240 | 12 | 12 | 12 | 12 | 12 | 12 | 12 | 12 | 12 |
| R26 | RD 5 (RD 1-6) | 480 | 24 | 24 | 24 | 24 | 24 | 24 | 24 | 24 | 24 |
| R27 | RD 6 (RD 1-6) | 960 | 48 | 48 | 48 | 48 | 48 | 48 | 48 | 48 | 48 |
| R28 | | | | | | | | | | | |
| R29 | | Pre Round 2 | 1st TO | 2nd TO | 3rd TO | 4th TO | Halftime | 5th TO | 6th TO | 7th TO | 8th TO |
| R30 | RD 2 Only | 55 | 52 | 49 | 45 | 39 | 32 | 25 | 17 | 8 | 2 |
| R31 | | | | | | | | | | | |
| R32 | RD 2 (RD 2-3) | 46 | 44 | 41 | 37 | 33 | 27 | 21 | 14 | 7 | 2 |
| R33 | RD 3 (RD 2-3) | 92 | 85 | 85 | 85 | 85 | 85 | 85 | 85 | 85 | 85 |
| R34 | | | | | | | | | | | |
| R35 | RD 2 (RD 2-4) | 31 | 29 | 27 | 25 | 22 | 18 | 14 | 9 | 5 | 1 |
| R36 | RD 3 (RD 2-4) | 62 | 48 | 48 | 48 | 48 | 48 | 48 | 48 | 48 | 48 |
| R37 | RD 4 (RD 2-4) | 124 | 95 | 95 | 95 | 95 | 95 | 95 | 95 | 95 | 95 |
| R38 | | | | | | | | | | | |
| R39 | RD 2 (RD 2-5) | 15 | 14 | 13 | 12 | 11 | 9 | 7 | 5 | 2 | 1 |
| R40 | RD 3 (RD 2-5) | 30 | 16 | 16 | 16 | 16 | 16 | 16 | 16 | 16 | 16 |
| R41 | RD 4 (RD 2-5) | 60 | 32 | 32 | 32 | 32 | 32 | 32 | 32 | 32 | 32 |
| R42 | RD 5 (RD 2-5) | 120 | 64 | 64 | 64 | 64 | 64 | 64 | 64 | 64 | 64 |
| R43 | | | | | | | | | | | |
| R44 | RD 2 (RD 2-6) | 3 | 3 | 3 | 2 | 2 | 2 | 1 | 1 | 0 | 0 |
| R45 | RD 3 (RD 2-6) | 6 | 6 | 5 | 5 | 4 | 4 | 3 | 2 | 1 | 0 |
| R46 | RD 4 (RD 2-6) | 12 | 11 | 11 | 10 | 9 | 7 | 5 | 4 | 2 | 0 |
| R47 | RD 5 (RD 2-6) | 24 | 23 | 21 | 20 | 17 | 14 | 11 | 7 | 4 | 1 |
| R48 | RD 6 (RD 2-6) | 48 | 46 | 42 | 39 | 34 | 28 | 22 | 14 | 7 | 2 |

FIG. 4A

|  |  | Pre Round 3 | 1st TO | 2nd TO | 3rd TO | 4th TO | Halftime | 5th TO | 6th TO | 7th TO | 8th TO |
|---|---|---|---|---|---|---|---|---|---|---|---|
| R50 |  |  |  |  |  |  |  |  |  |  |  |
| R51 | RD 3 Only | 85 | 81 | 75 | 69 | 60 | 50 | 38 | 26 | 13 | 3 |
| R52 |  |  |  |  |  |  |  |  |  |  |  |
| R53 | RD 3 (RD 3-4) | 48 | 46 | 42 | 39 | 34 | 28 | 22 | 14 | 7 | 2 |
| R54 | RD 4 (RD 3-4) | 95 | 87 | 87 | 87 | 87 | 87 | 87 | 87 | 87 | 87 |
| R55 |  |  |  |  |  |  |  |  |  |  |  |
| R56 | RD 3 (RD 3-5) | 16 | 15 | 14 | 13 | 11 | 9 | 7 | 5 | 2 | 1 |
| R57 | RD 4 (RD 3-5) | 32 | 29 | 29 | 29 | 29 | 29 | 29 | 29 | 29 | 29 |
| R58 | RD 5 (RD 3-5) | 64 | 59 | 59 | 59 | 59 | 59 | 59 | 59 | 59 | 59 |
| R59 |  |  |  |  |  |  |  |  |  |  |  |
| R60 | RD 3 (RD 3-6) | 6 | 6 | 5 | 5 | 4 | 4 | 3 | 2 | 1 | 0 |
| R61 | RD 4 (RD 3-6) | 11 | 10 | 10 | 10 | 10 | 10 | 10 | 10 | 10 | 10 |
| R62 | RD 5 (RD 3-6) | 23 | 21 | 21 | 21 | 21 | 21 | 21 | 21 | 21 | 21 |
| R63 | RD 6 (RD 3-6) | 46 | 42 | 42 | 42 | 42 | 42 | 42 | 42 | 42 | 42 |
| R64 |  |  |  |  |  |  |  |  |  |  |  |
| R65 |  | Pre Round 4 | 1st TO | 2nd TO | 3rd TO | 4th TO | Halftime | 5th TO | 6th TO | 7th TO | 8th TO |
| R66 | RD 4 Only | 87 | 81 | 75 | 69 | 60 | 50 | 38 | 26 | 13 | 3 |
| R67 |  |  |  |  |  |  |  |  |  |  |  |
| R68 | RD 4 (RD 4-5) | 29 | 28 | 26 | 23 | 20 | 17 | 13 | 8 | 4 | 1 |
| R69 | RD 5 (RD 4-5) | 59 | 54 | 54 | 54 | 54 | 54 | 54 | 54 | 54 | 54 |
| R70 |  |  |  |  |  |  |  |  |  |  |  |
| R71 | RD 4 (RD 4-6) | 10 | 10 | 9 | 8 | 7 | 6 | 5 | 3 | 2 | 0 |
| R72 | RD 5 (RD 4-6) | 21 | 19 | 19 | 19 | 19 | 19 | 19 | 19 | 19 | 19 |
| R73 | RD 6 (RD 4-6) | 42 | 39 | 39 | 39 | 39 | 39 | 39 | 39 | 39 | 39 |
| R74 |  |  |  |  |  |  |  |  |  |  |  |
| R75 |  | Pre Round 5 | 1st TO | 2nd TO | 3rd TO | 4th TO | Halftime | 5th TO | 6th TO | 7th TO | 8th TO |
| R76 | RD 5 Only | 54 | 51 | 48 | 44 | 38 | 32 | 24 | 16 | 8 | 2 |
| R77 |  |  |  |  |  |  |  |  |  |  |  |
| R78 | RD 5 (RD 5-6) | 19 | 18 | 17 | 15 | 13 | 11 | 9 | 6 | 3 | 1 |
| R79 | RD 6 (RD 5-6) | 39 | 36 | 36 | 36 | 36 | 36 | 36 | 36 | 36 | 36 |
| R80 |  |  |  |  |  |  |  |  |  |  |  |
| R81 |  | Pre Round 6 | 1st TO | 2nd TO | 3rd TO | 4th TO | Halftime | 5th TO | 6th TO | 7th TO | 8th TO |
| R82 | RD 6 Only | 36 | 34 | 32 | 29 | 26 | 21 | 16 | 11 | 5 | 1 |

FIG. 4B

SYSTEMS AND METHODS FOR ADMINISTERING A PREDICTION GAME

CROSS-REFERENCE TO RELATED APPLICATION

This application is a continuation of and claims priority to co-pending U.S. Pat. Application No. 15/893,802, titled "Systems and Methods for Administering a Prediction Game" and filed on Feb. 12, 2018, which is a continuation of and claims priority to U.S. Pat. Application No. 15/191,059, titled "Systems and Methods for Administering a Prediction Game" and filed on Jun. 23, 2016, which is a continuation of and claims priority to U.S. Pat. Application No. 14/657,631, titled "Systems and Methods for Administering a Prediction Game" and filed on Mar. 13, 2015, which claims the benefit under 35 U.S.C 119(e) of U.S. Provisional Pat. Application No. 61/952,443, titled "SYSTEMS AND METHODS FOR ORGANIZING A COMPETITION BASED ON MAKING SELECTIONS IN A BRACKET STYLE TOURNAMENT" and filed on Mar. 13, 2014, each of which is hereby incorporated by reference herein in its entirety.

FIELD OF THE INVENTION

Aspects of the present disclosure relate generally to prediction games, and, in particular, to techniques for determining the score of a prediction game's participant.

BACKGROUND

Tournaments generally provide a structure whereby a set of competitors can compete against each other to determine a tournament champion. Although tournament structures vary, tournaments generally involve a sequence of rounds (or stages) in which subsets of the competitors compete against each other to determine which competitors are eliminated from the tournament and which competitors advance to the next round. In bracket-style tournaments, the results of a tournament round may determine not only which competitors advance to the next round of the tournament, but also which competitors compete against each other in the next round. Such tournaments are referred to herein as "bracket-style tournaments" because the tournament rounds can be organized diagrammatically into structures that resemble brackets (e.g.,'}', '{', ']-', or '-['). FIG. 2A illustrates a diagrammatic layout of a portion of a bracket-style tournament.

Examples of tournament rounds include group rounds and/or head-to-head rounds. In a group round, subsets of the competitors may be assigned to groups, and the competitors within a group may compete against each other in head-to-head competitions. Based on the results of the head-to-head competitions, one or more competitors from each group may advance to the tournament's next round. Examples of group rounds include the group stage of the quadrennial FIFA World Cup Finals (in which thirty-two soccer teams compete in eight groups of four, with each team in a group playing all the other teams in the group once, and two teams from each group advancing to the next round of competition), the group stage of the annual UEFA Champions League (in which thirty-two soccer teams compete in eight groups of four, with each team in a group playing all the other teams in the group twice, and two teams from each group advancing to the next round of competition), and the first rounds of the annual NCAA Division I Baseball and Softball Championship tournaments. In a head-to-head round, two competitors compete against each other head-to-head in a single competition or multiple competitions, with the winner advancing to the tournament's next round. Examples of head-to-head rounds with single competitions include the second stages of the FIFA World Cup Finals and the UEFA Champions League, in which the sixteen teams that advanced from the group stage compete against each other in eight games, with the eight winners advancing to the quarterfinal stage, and the eight losers being eliminated. Examples of head-to-head rounds with multiple competitions include each round of the Major League Baseball playoffs (in which teams compete against each other in a best-of-five series or a best-of-seven series), and each round of the National Basketball Association playoffs (in which teams compete against each other in a best-of-seven series).

One example of a bracket-style tournament is the annual NCAA Division I Men's Basketball Championship, often referred to as "March Madness," which (ignoring the preliminary round) includes 64 competing teams and is organized into 6 rounds. In the first round each team competes against another team in one of 32 first-round matchups. The 32 winners of the first-round matchups advance to the second round, while the 32 losers are eliminated from the tournament. In the second round, each first-round winner competes against another first-round winner in one of 16 second-round matchups. The 16 winners of the second-round matchups advance to the third round, while the 16 losers are eliminated from the tournament. This process continues until only one team remains – the tournament champion. (The NCAA now refers to the preliminary round of four games as the "first round," the round of 32 games as the "second round," and so on. Herein, the NCAA tournament's round of 32 games is referred to as its "first round," the round of 16 games is referred to as the "second round," and so on.)

A popular activity associated with bracket-style tournaments is to predict the winners of the individual matchups and/or the group matchups. In some instances, predicting the outcomes of the matchups can be its own separate game. In conventional prediction games, participants are generally awarded some number of points for correctly predicting the winner of a matchup. Participants may compete against each other in groups, with the participant having the most points at the end of the tournament being the winner of the prediction game.

SUMMARY OF THE INVENTION

Advantages of Some Embodiments of the Invention

Participating in a prediction game generally increases the participant's interest in the underlying tournament. In general, individuals who participate in a prediction game associated with a tournament may show greater interest in media associated with the tournament (e.g., print, radio, television, and/or Internet media) than individuals who do not participate in the prediction game. Prediction game participants may show such interest by consuming more media associated with the tournament (e.g., watching more broadcasts or highlights of the tournament), by engaging in more live consumption of tournament media (as opposed to engaging in time-shifted consumption of tournament media), and/or by paying more attention to tournament media (as opposed to the participant's attention being split between the tournament media and some other media or activity). For the organizers of a tournament, increased interest in the tournament generally yields increased revenue from broadcasters, advertisers, and/or spectators. For example, advertisers may pay significantly more for advertising slots in a tournament broadcast as the number of viewers increases and as the viewers' interest levels increase.

Thus, it is desirable for a prediction game to increase interest in the underlying tournament as much as possible. However, conventional prediction games often do not increase interest in the later rounds of the underlying tournament, because many participants know that their predictions for competitions in the later rounds are incorrect before those later rounds of the tournament even begin. Conventional prediction games fail to increase interest in a tournament's later rounds because such games generally require participants to submit predictions for an entire tournament bracket prior to the start of the tournament, and do not permit participants to change their predictions after the tournament begins. Specifically, if a participant incorrectly predicts that a competitor will advance to the tournament's later rounds, but the competitor loses in the tournament's earlier rounds, then the participant will know as soon as the competitor loses that any predictions of subsequent victories for the competitor are incorrect. For example, if a participant predicts that Duke will win the NCAA Men's Basketball Championship, but Duke loses in the tournament's first round, the participant will know that the predicted victories for Duke in the tournament's second through sixth rounds are all incorrect. At some point, if too many of the participant's predictions for future competitions are known to be incorrect before those competitions begin, the participant may lose interest in the prediction game and the underlying tournament.

Some prediction games allow participants to make their picks on a round-by-round basis. In such prediction games, participants submit predictions for a tournament round prior to the start of that round, but do not submit predictions for subsequent rounds until the preceding rounds have been completed. Such prediction games place all participants on equal ground at the beginning of each round, but fail to reward participants who have the foresight to correctly predict the outcome of the tournament more than one round in advance. Thus, interest in such prediction games has generally not been high.

What is needed is a technique for administering a prediction game that generates high interest in the tournament not only during the tournament's early rounds, but throughout the tournament. The inventors have recognized and appreciated that a prediction game may generate and maintain a high level of interest in an underlying tournament if the prediction game not only rewards participants for making accurate predictions about the tournament's competitions, but also rewards participants for making those accurate predictions sooner rather than later. For example, a participant who correctly predicts the outcome of a fifth-round competition prior to the first round of a tournament may be awarded P points for that prediction, while a participant who correctly predicts the outcome of the same competition after the fourth round, or during the fifth round, or even during the competition, may be awarded fewer than P points for that prediction. This technique may encourage participants not only to submit thoughtful predictions prior to the tournament, but also to remain engaged with tournament media throughout the tournament, so that the participants can correct erroneous predictions as soon as possible.

The inventors have also recognized and appreciated that a prediction game may generate and maintain a high level of interest in an underlying tournament if the rules of the prediction game permit participants to submit new predictions and/or change existing predictions during the tournament, and even during the competition to which the prediction pertains. In some cases, allowing participants to change their predictions during the tournament and/or during the competitions may motivate the participant to maintain a high level of interest in media pertaining to the tournament, so that the participant can change poor predictions as soon as possible.

In some embodiments, the techniques disclosed herein may improve the functioning of a prediction game by awarding points to participants based on the accuracy and timeliness of their predictions. For example, participants may be awarded more points for submitting an accurate prediction of a competition's outcome prior to the beginning of the tournament, fewer points for submitting an accurate prediction of the competition's outcome after the beginning of the tournament but before the beginning of the tournament round in which the competition occurs, still fewer points for submitting an accurate prediction of the competition's outcome after the competition's round begins but before the competition begins, still fewer points for submitting an accurate prediction of the competition's outcome after the competition begins, etc. Allowing submission of a prediction during a tournament and determining the value of such a prediction based on the prediction's timeliness is an unconventional step not routine in the field, which confines the technique described herein to a useful application.

Summary

According to an aspect of the present disclosure, a game administration method is provided, comprising: presenting a user interface (UI) to a participant in a prediction game, wherein the UI includes interface components for selecting competitors in a tournament as predicted winners of competitions included in the tournament; receiving, via a first of the interface components, data indicating a selection by the participant of a first of the competitors as a predicted winner of a first of the competitions; determining a score of the participant based, at least in part, on a time at which the participant selected the first competitor as the predicted winner of the first competition; and presenting the score via the user interface.

According to another aspect of the present disclosure, an apparatus for administering a prediction game is provided, the apparatus comprising: a memory configured to store processor-executable instructions; and a processor configured to execute the processor-executable instructions, wherein executing the processor-executable instructions causes the apparatus to administer a prediction game by: presenting a user interface (UI) to a participant in the prediction game, wherein the UI includes interface components for selecting competitors in a tournament as predicted winners of competitions included in the tournament; receiving, via a first of the interface components, data indicating a selection by the participant of a first of the competitors as a predicted winner of a first of the competitions; determining a score of the participant based, at least in part, on a time at which the participant selected the first competitor as the predicted winner of the first competition; and presenting the score via the user interface.

According to another aspect of the present disclosure, an apparatus for administering a prediction game is provided, the apparatus comprising: a memory configured to store processor-executable instructions; and a processor configured to execute the processor-executable instructions, wherein executing the processor-executable instructions causes the apparatus to administer a prediction game in which a participant selects competitors in a tournament as predicted winners of competitions included in the tournament by: receiving, from a client device, a request for potential value to a participant of a prospective selection by the participant of a first of the competitors as a predicted winner of a first of the competitions, determining the potential value to the participant of the prospective selection based, at least in part, on a time associated with the prospective selection and/or on occurrence of one or more events prior to the time associated with the prospective selection, and sending, to the client device, the determined potential value of the prospective selection.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 3 is a schedule of potential values for predictions in a prediction game, in accordance with some embodiments;

FIG. 4A is a first portion of another schedule of potential values for predictions in a prediction game, in accordance with some embodiments;

FIG. 4B is a second portion of another schedule of potential values for predictions in a prediction game, in accordance with some embodiments;

DETAILED DESCRIPTION

Figure 1:
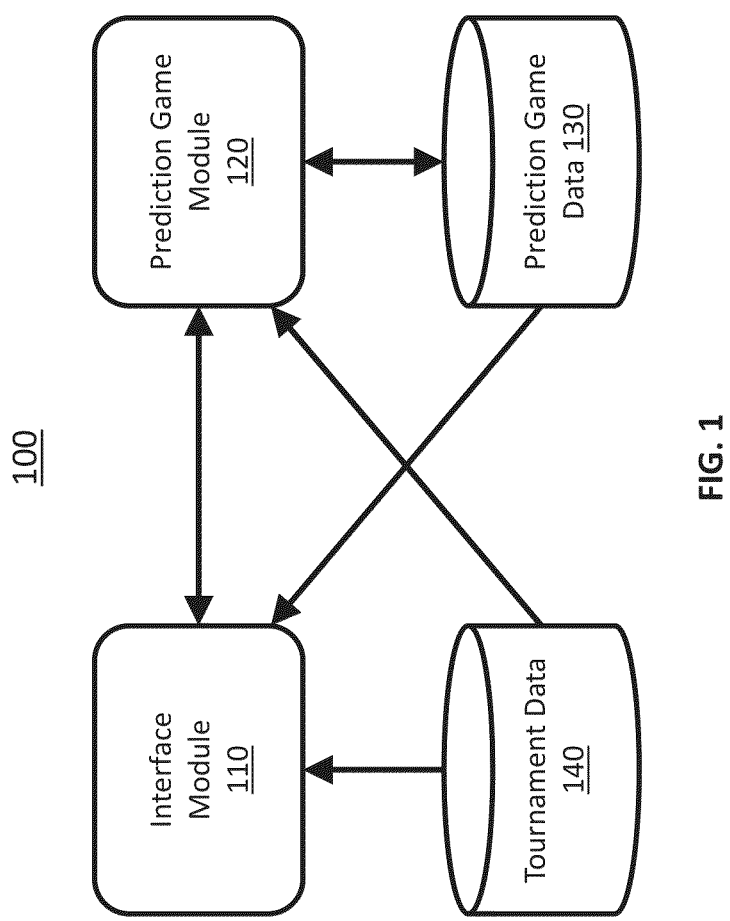
FIG. 1 is a block diagram of a system for administering a prediction game, in accordance with some embodiments.

FIG. 1 shows a system 100 for administering a prediction game (a "prediction game system"), according to some embodiments. Participants in the prediction game may make predictions regarding future events, including, without limitation, predictions regarding the outcomes of competitions in a tournament. Administering a prediction game may include executing prediction game software; controlling the operation of the prediction game; managing communication, input, output, or processing to implement the prediction game, monitoring the status of a tournament, and/or performing any other act that facilitates participation in a prediction game.

In some embodiments, prediction game system 100 includes an interface module 110 and a prediction game module 120, which operate on prediction game data 130 and/or tournament data 140 to administer a prediction game. Tournament data 140 may include data relating to one or more tournaments that are the subject of predictions in a prediction game. Such tournaments may be referred to herein as "underlying tournaments" or a "tournaments underlying a prediction game."

Interface module 110 presents (e.g., displays) one or more user interfaces of prediction game system 100. A user interface (UI) may present information associated with a tournament underlying a prediction game, information associated with the prediction game, information associated with a participant's predictions, and/or interface components for providing input (e.g., predictions) to the prediction game. Interface module 110 may communicate with prediction game module 120 to determine the potential value of a participant's prediction, the potential values of alternative predictions, whether the participant is permitted to submit a prediction for a competition, etc. Interface module 110 may communicate new predictions submitted by the participant to prediction game module 120.

The UI may present any suitable information associated with a tournament underlying a prediction game. Such "tournament information" may include, without limitation, a tournament bracket (e.g., the bracket's structure, the locations of tournament competitors within the bracket structure, the competitors' rankings or seeds within the tournament, etc.), the outcomes of completed tournament competitions (e.g., final scores, the identities of the winning and losing competitors, etc.), the status of ongoing tournament competitions (e.g., the identities of the competitors, the competitors' current scores, time remaining in the game, probability of each competitor winning the competition, etc.), the status of future tournament competitions (e.g., the identities of the competitors, if known, the date and/or time of the future competition, etc.), and/or any other suitable information associated with the tournament or any of its competitions.

Figure 2A:
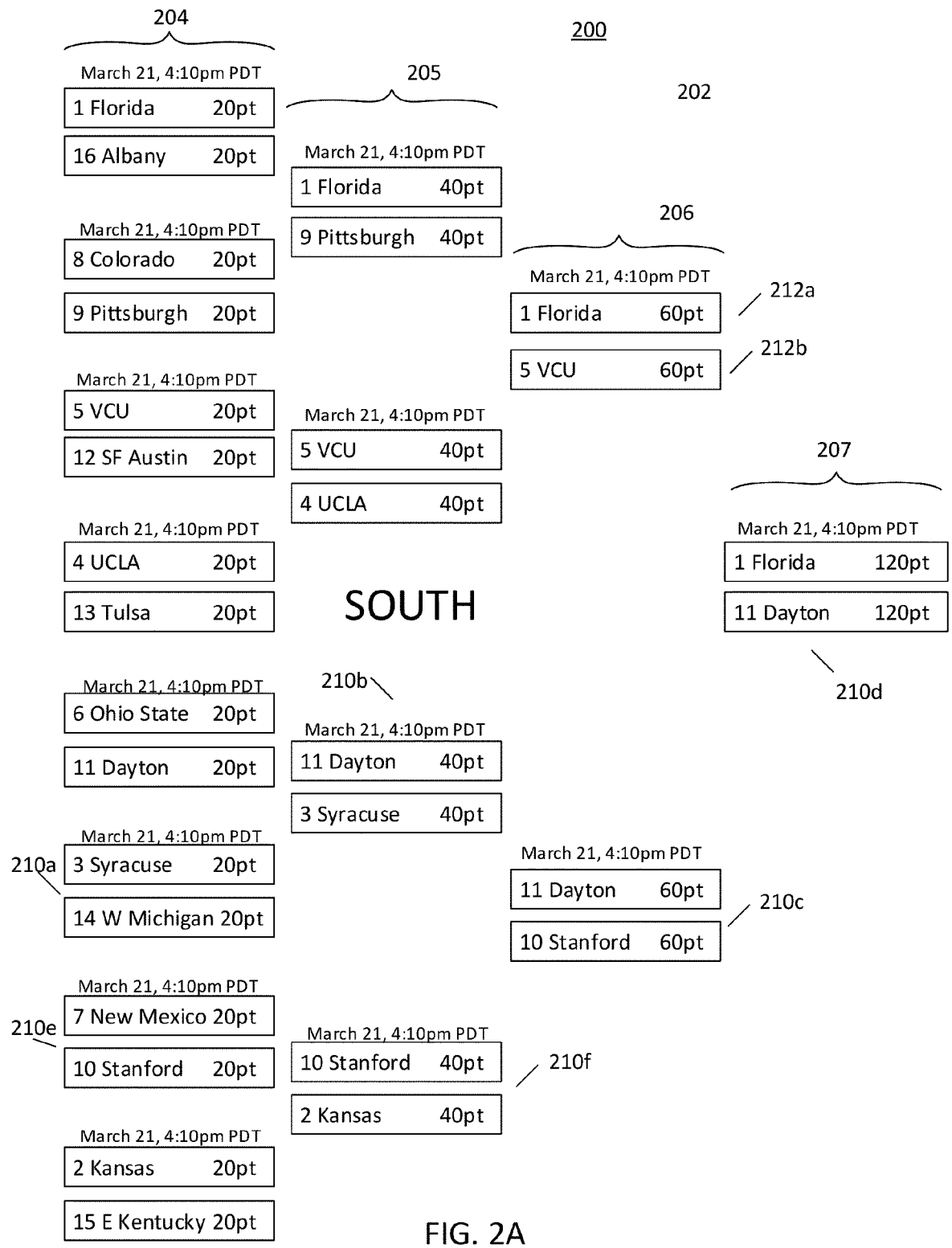
FIG. 2A is a user interface for interacting with a prediction game system, in accordance with some embodiments.

Some examples of tournament information are illustrated in FIG. 2A, which shows a portion 200 of a user interface for a prediction game system, according to some embodiments. UI portion 200 includes tournament information for the South Regional bracket of the 2014 NCAA Division I Men's Basketball Championship tournament. In particular, UI portion 200 includes the structure 202 of the South Regional bracket, which includes four rounds 204-207. The first round 204 includes sixteen competitors competing head-to-head in eight games. The second round 205 includes the eight winners from the first round competing head-to-head in four games. The third round 206 includes the four winners from the third round competing head-to-head in two games. The fourth round 207 includes the two winners from the third round competing head-to-head in one game. In the example of FIG. 2A, the participants and the matchups in the first round are known, but the participants and the matchups in the second, third, and fourth rounds are speculative (e.g., predicted by a prediction game participant prior to the beginning of the first round).

Figure 2B:
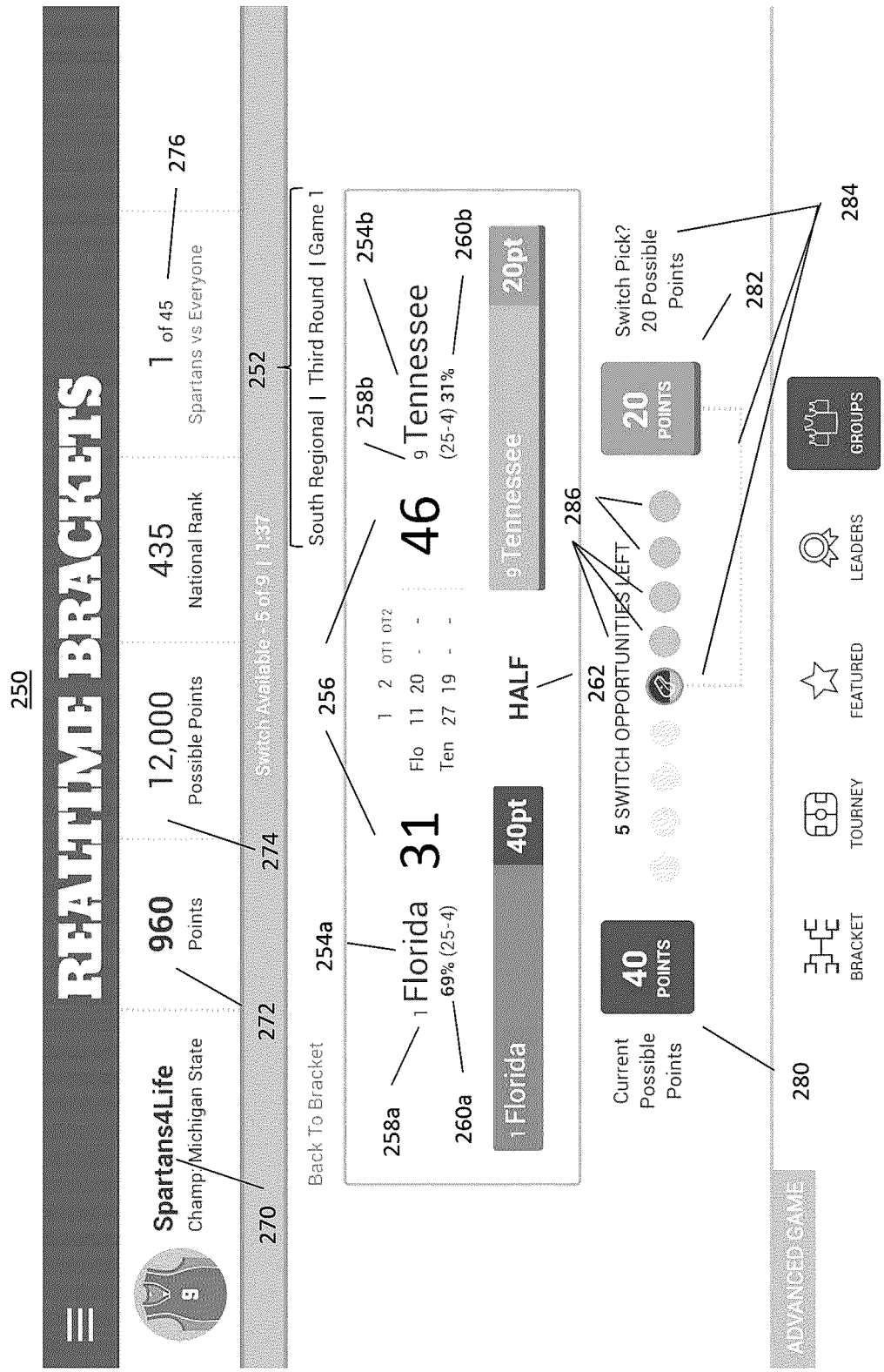
FIG. 2B is another user interface for interacting with a prediction game system, in accordance with some embodiments.

Additional examples of tournament information are illustrated in FIG. 2B, which shows a portion 250 of a user interface for a prediction game system, according to some embodiments. UI portion 250 includes tournament information for a competition between Florida and Tennessee in the third round of the South Regional bracket of an NCAA basketball tournament. In particular, UI portion 250 identifies the location 252 of the competition in the tournament's South Regional bracket, the competitors' identities 254, scores 256, and seeds 258, each competitor's probability of winning the competition 260, and the competition's current phase 262.

The UI may present any suitable information associated with a prediction game. Such "prediction game information" may include, without limitation, the prediction game participant's score, the participant's potential score (e.g., for an individual prediction, for a specified group of predictions, for the predictions associated with a path through the tournament bracket, and/or for the entire game), and/or information relating to the participant's predictions. Information relating to a participant's prediction may include the subject of the prediction (e.g., the competitor predicted to win a competition), the potential value of one or more predictions, the probability of one or more predictions being correct, and/or the expected value of one or more predictions. A potential value, probability, and/or expected value presented by the UI may pertain to a prediction for an individual competition, a group of predictions for a specified group of competitions, predictions for a specified path through the tournament bracket, and/or predictions for all remaining competitions in the tournament. The probability of a participant's prediction for an individual competition being correct may be determined based on any suitable information, including, without limitation, the status of the competition (e.g., score, time remaining), other participants' predictions for the competition, results of polling, etc. The probability of a participant's prediction for a group of competitions being correct may be determined by combining the probabilities for the individual competitions in the group.

A path through a tournament bracket may include a set of competitions C1 ... Cn in the tournament bracket such that the winner of competition Ci becomes a competitor in competition in Ci+1. Referring to FIG. 2A, competitions 210a-210d form one path from the first round 204 to the fourth round 207 of the illustrated bracket. As another example, competitions 210e, 210f and 210c form a path from the first round 204 to the third round 206 of the illustrated bracket.

In some embodiments, the prediction game information may include information identifying a participant (e.g., a name, username, avatar, icon, and/or image associated with the participant). In some embodiments, the prediction game information may include information associated with a league or game in which the participant is competing against other prediction game participants (e.g., information identifying the league, the league's participants, the scores of the league's participants, the participant's standing within the league, etc.).

Some examples of prediction game information are illustrated in FIGS. 2A-2B. In particular, for each competition in the bracket, FIG. 2A shows the potential value 212 of predicting either competitor to win the competition. In the example of FIG. 2A, the tournament has not yet begun, and the potential values associated with predicting either competitor to win a competition are the same. Referring to FIG. 2B, UI portion 250 includes a participant's username 270, the participant's current score 272, the participant's maximum potential score 274, and the participant's rank 276 in a league. UI portion 250 also shows the potential value 280 of maintaining the participant's current prediction for the competition and the potential value 282 of submitting a new prediction for the competition.

Interface module 110 may obtain the tournament information from any suitable source, including, without limitation, tournament data 140. In some embodiments, tournament data 140 may be manually entered based on observation of the tournament's competitions, extracted from a suitable data source (e.g., scraped from a website), received from a data provider (e.g., the tournament's operator), and/or acquired using any other suitable technique. Interface module 110 may obtain the prediction game information from any suitable source, including, without limitation, prediction game data 130.

The UI may include interface components for submitting new predictions (e.g., for selecting a predicted winner of a competition). In some embodiments, the interface components may indicate whether the participant is currently permitted to submit a new prediction for a competition (e.g., by displaying text and/or graphics indicating whether the participant is permitted to submit a new prediction, by enabling or disabling a component for submitting new predictions, etc.). In some embodiments, the interface components may indicate whether the participant will be permitted to submit a new prediction for a competition in the future. For example, in cases where a participant is permitted to submit a new prediction for a competition during specific time periods while the competition is ongoing, the interface components may indicate when the participant is or will be permitted to submit a new prediction for the competition. Referring to FIG. 2B, UI portion 250 includes graphics and text 284 indicating that the participant is currently permitted to submit a new prediction for the competition between Florida and Tennessee. UI portion 250 also includes graphics and text 286 indicating that the participant will have additional opportunities to submit a new prediction for the competition in the future.

In some embodiments, the interface components may indicate the potential value 280 of maintaining the current prediction for the competition. The potential value of maintaining a prediction may include the maximum value of the prediction (e.g., the number of points that will be awarded to the participant if the participant's current prediction for the competition turns out to be correct), and/or the expected value of the prediction (e.g., the product of the maximum value of the prediction and the probability that the prediction is correct).

In some embodiments, the interface components may indicate the potential value 282 of submitting a new prediction for the competition. The potential value of submitting a new prediction may include the maximum value of the new prediction (e.g., the number of points that will be awarded to the participant if the participant's new prediction for the competition turns out to be correct), and/or the expected value of the new prediction (e.g., the product of the maximum value of the new prediction and the probability that the new prediction is correct).

In some embodiments, the interface components may indicate how maintaining a current prediction and/or submitting a new prediction would impact the potential values of predictions along a path through the tournament bracket. In cases where the participant has predicted that a competitor A will win two or more competitions Ci ... Cn along a path through the tournament, and the participant submits a new prediction that a different competitor B will win competition Ci, the prediction game system may automatically void the participant's predictions that competitor A would win competitions Ci+1 ... Cn. In some embodiments, in addition to voiding the participant's predictions for competitions Ci+1 ... Cn, the user interface may prompt the participant to submit new predictions for competitions Ci+1 ... Cn. By displaying the potential values of the current predictions along path Ci ... Cn and/or the potential values of new predictions along path Ci ... Cn, the interface components may facilitate the participant's decision to maintain the current prediction for competition Ci or to submit a new prediction. In some embodiments, the interface components may present the total potential value of maintaining a set of current predictions for a tournament path, and/or the total potential value of submitting a new set of predictions for the tournament path. These "potential path values" may include the maximum potential value along the tournament path and/or the expected potential value along the tournament path.

The preceding paragraph describes an embodiment in which the prediction game does not permit a participant to hedge a prediction by predicting that a competitor will lose a competition and also predicting that the competitor will win a subsequent competition in a later round of the tournament. In some embodiments, the prediction game may permit such hedging.

When a participant submits a new prediction, the UI may send the data associated with the new prediction to prediction game module 120 and/or store the new prediction in the prediction game data 130. Likewise, interface module 110 may obtain data used or presented by the interface components from prediction game module 120 and/or prediction game data 130.

Returning to FIG. 1, prediction game module 120 manages the operation of the prediction game. Prediction game module 120 may determine whether a participant is permitted to submit a new prediction for a competition, the potential value of a participant's prediction, a participant's score, a participant's standing within a league, etc. Prediction game module 120 may perform these functions by applying the rules of the prediction game to the game's state, which may be represented by prediction game data 130 and tournament data 140. In some embodiments, the rules of the prediction game may be encoded in computer-executable instructions, stored in prediction game module 120, and/or stored in prediction game data 130.

Prediction game module 120 may use any suitable information and/or rules to determine whether the participant is permitted to submit a new prediction for a competition. In some embodiments, prediction game module 120 may determine whether a participant is permitted to submit a new prediction for a competition based, at least in part, on the type of prediction game being played by the participant, whether one or more specified events have occurred, the status of the competition, and/or the passage of real-world time or competition time. As used herein, "real-world time" refers to conventional time, and "competition time" refers to time that starts, stops, and elapses in accordance with the rules of the competition.

In some embodiments, depending on the type of prediction game, prediction game module 120 may permit a participant to submit a new prediction for a competition at any time prior to the conclusion of the competition, at a time prior to the start of the competition and/or at designated times during the competition, only at times prior to the start of the competition, only at times prior to the start of the tournament round that includes the competition, only at times prior to the start of the tournament, or at any other suitable times.

In some embodiments, prediction game module 120 may determine whether a participant is permitted to submit a new prediction for a competition based, at least in part, on whether one or more specified events have occurred. Such events may include, without limitation, the beginning of the tournament, the beginning of a round of the tournament (e.g., the round that includes the competition), the beginning of the competition, the end of the competition, and/or events within the competition (e.g., a break in competition for a timeout, television timeout, injury, or commercial; a break in competition between periods or at halftime; etc.).

In some embodiments, prediction game module 120 may determine whether a participant is permitted to submit a new prediction for a competition based, at least in part, on the status of the competition. The status of the competition may include, without limitation, whether the competition is in a timeout, a television timeout, a halftime break, a break between periods, or any other suitable break in competition. In some embodiments, new predictions for an ongoing competition may be submitted only during the competition's television timeouts and/or halftime break. In some embodiments, the status of the competition may include the current score differential. For example, participants may be permitted to submit a new prediction for a competition only when the difference between the competitors' scores is less than a threshold. In some embodiments, the status of the competition may include the amount of competition time elapsed or remaining in the competition. In some embodiments, the status of the competition may include each competitor's probability of winning the competition. For example, participants may be prohibited from submitting a new prediction for a competition when a competitor's probability of winning the competition is greater than a threshold probability (e.g., 55%, 60%, 65%, 70%, 75%, 80%, 85%, 90%, 95%).

In some embodiments, prediction game module 120 may determine whether a participant is permitted to submit a new prediction for a competition based, at least in part, on the passage of real-world time and/or the passage of competition time. For example, a participant may be permitted to submit a new prediction for a competition if the amount of elapsed competition time is less than a threshold or if the amount of remaining competition time is greater than a threshold. As another example, a participant may be permitted to submit a new prediction for a competition if the current real-world time is earlier than a specified real-world time, if the amount of real-world time that has elapsed since the start of the competition is less than a threshold amount of time, etc.

Prediction game module 120 may use any suitable information and/or rules to determine the potential value of a prediction. In some embodiments, prediction game module 120 may apply a formula to determine the potential value of a prediction. Inputs to the formula may include any suitable data, including, without limitation, data indicating the type of prediction game being played by the participant (e.g., different types of prediction games may use different formulas to determine the potential value of a prediction), data indicating whether one or more specified events have occurred, data indicating the status of the competition, data indicating the real-world time, and/or data indicating the competition time. For example, the potential value of a prediction for a competition may generally decrease as the competition progresses through various stages, which may be identified based on the occurrence of events, the status of the competition, and/or the passage of time.

In some embodiments, prediction game module 120 may use a schedule to determine the potential value of a prediction. Such a schedule may map data associated with a prediction to a corresponding potential value for the prediction. For example, for a prediction of the outcome of a specified competition, prediction game module 120 may determine the potential value of the prediction by searching the schedule for the time at which the prediction is made and the tournament round that includes the competition.

FIG. 3 shows a schedule 300 that maps the tournament round in which a competition occurs and the time at which a prediction regarding the competition is made (e.g., prior to the start of the tournament, after the start of the tournament but before the start of a specified round, or after the start of the competition) to the potential value of the prediction. Schedule 300 is organized in 10 columns, labeled C1-C10, and 38 rows, labeled R1-R38. As can be seen in column C1 and rows R1-R7, predictions submitted prior to the start of the tournament for competitions in the first, second, third, fourth, fifth, and sixth rounds of the tournament have potential values of 30, 60, 120, 240, 480, and 960 points, respectively.

Columns C2-C10 of row R2 show that during the first round of the tournament, a prediction submitted for one of the first round's competitions has a potential value between 27 points and 19 points, depending on the time at which the prediction is submitted. In particular, predictions submitted during the first TV timeout have a potential value of 27 points, predictions submitted during the second TV timeout have a potential value of 26 points, and so on. Row R8 shows the potential value of predicting a competitor to win the entire tournament prior to the start of the first round (column C1).

Rows R10-R16 relate to predictions submitted before or during the second round. In particular, column C1 of rows R11-R15 shows that after the first round begins but before the second round begins, predictions submitted for competitions in the second, third, fourth, fifth, and sixth rounds have potential values of 48, 96, 192, 384, and 768 points, respectively. Columns C2-C10 of row R11 show that during the second round of the tournament, a prediction submitted for one of the second round's competitions has a potential value between 45 points and 29 points, depending on the time at which the prediction is submitted. Row R16 shows the potential value of predicting a competitor to win the tournament prior to the start of the second round (column C1).

Rows R18-R22 relate to predictions submitted before or during the third round. In particular, column C1 of rows R19-R22 shows that after the second round begins but before the third round begins, predictions submitted for competitions in the third, fourth, fifth, and sixth rounds have potential values of 76, 152, 304, and 608 points, respectively. Columns C2-C10 of row R19 show that during the third round of the tournament, a prediction submitted for one of the third round's competitions has a potential value between 71 points and 39 points, depending on the time at which the prediction is submitted. Row R23 shows the potential value of predicting a competitor to win the tournament prior to the start of the third round (column C1).

The meaning of the remainder of schedule 300 will be clear to one of ordinary skill in the art, and is not belabored here.

The potential values illustrated in schedule 300 are non-limiting. Any suitable potential values may be used. In some embodiments, the potential values may be selected to reward participants for submitting accurate initial predictions, and to reward participants for replacing inaccurate predictions with accurate predictions as early as possible. In this way, the schedule may encourage participants to maintain a high level of interest in the tournament. Some techniques for determining potential values of predictions (e.g., for determining the point values to assign to the elements of a schedule) are described below.

In the example of FIG. 3, the potential values of predictions for competitions in rounds $R_x+1$ through $R_m$ are the same if the predictions are submitted during round $R_x$ or after round $R_x$ but prior to the start of round $R_x+1$. In some embodiments, the potential values of predictions for competitions in rounds $R_x+1$ through $R_m$ may be higher if the predictions are submitted during round $R_x$ than if the predictions are submitted after round $R_x$ but before the start of round $R_x+1$.

Schedule 300 is a non-limiting example of a schedule that may be used to determine the potential value of a prediction. In the example of schedule 300, the potential value of a prediction for a competition depends only on the time when the prediction is made and the round in which the competition takes place. As described elsewhere herein, a schedule may use other information in addition to and/or in alternative to the time of the prediction and the round of the competition to determine the potential value of a prediction.

In some embodiments, the potential values of predictions may be assigned such that the potential value of a prediction submitted at an earlier time is greater than or equal to the potential value of the same prediction submitted at a later time. Any suitable technique may be used to depreciate the value of a prediction based on the time at which the prediction is submitted. In some embodiments, the potential value of a prediction may be highest if submitted before the tournament begins, and successively lower if submitted after the tournament begins, after the round that includes the competition begins, and/or after the competition begins. In some embodiments, the potential value of a prediction may be higher if submitted before a competition begins, lower if submitted after a competition begins, and successively lower if submitted after passage of one or more periods of real-world time or competition time during the competition. These technique embody the above-described principle that participants should be rewarded for making correct predictions sooner rather than later.

In embodiments where the potential value of submitting a prediction for a competition decreases during the competition, the potential value of submitting the prediction during the competition may be bounded by the potential value of submitting the prediction before the start of the competition and the potential value of submitting the prediction after the end of the competition (generally zero points). In some embodiments, the potential value of the prediction may decrease linearly from the upper bound to the lower bound during the competition. In some embodiments, the potential value of the prediction may decrease nonlinearly from the upper bound to the lower bound during the competition. For example, the competition may be divided into S segments, and the potential value of the prediction may decrease as a sigmoid function of the competition's current segment. In some embodiments, the divisions between segments of a competition may correspond to the ends of periods of competition (e.g., end of the first period, end of the second period, end of the third period, end of the fourth period, end of an inning or half-inning, end of an overtime period, end of the first half, end of the second half, etc.). In some embodiments, the divisions between segments of a competition may correspond to breaks in the competition (e.g., timeouts, television timeouts, injury timeouts, commercial breaks, etc.).

In some embodiments, the potential value of submitting a new prediction for a competition shortly before the end of the competition may be non-zero. Rewarding a participant for submitting a new prediction just before the end of a competition may facilitate maintaining the participant's interest near the end of the competition.

In some embodiments, the potential value of predicting a new winner for a competition may depend on the accuracy of one or more of the participant's previous predictions. For example, the potential value of predicting that competitor A will defeat competitor B in a competition may decrease as competitor A's lead over competitor B increases, thereby penalizing the participant for previously selecting competitor B as the predicted winner of the competition in which competitor B subsequently faces a large deficit. As another example, in cases where the participant predicted that competitor B would win not only competition Ci but also N competitions Ci+1 through Cn in subsequent rounds, the potential value of predicting that competitor A will defeat competitor B in competition Ci may decrease as the number of competitions N increases, thereby penalizing the participant for reversing N+1 predictions of competitor B winning competitions. Additionally or alternatively, the potential values associated with predicting new winners of competitions Ci+1 through Cn may decrease as the length of the path from Ci to Cn increases. In other words, the points available for predictions along a path from competition Ci to Cn may decrease as the length of the path increases, thereby penalizing the participant for reversing a prediction that a particular competitor would advance a long way along that path. In some embodiments, the points available for changing predictions along a path may decrease as a linear or nonlinear (e.g., sigmoid) function of the length of the path.

In some embodiments, the potential value of predicting a new winner for a competition may depend on the competitors' respective probabilities of winning the competition. For example, the potential value of predicting competitor A to win a competition may increase in cases where the probability of competitor A winning the competition is less than a threshold probability (e.g., 50%, 40%, 30%, 25%, 20%, 15%, 10%, 5%). As another example, the potential value of predicting competitor A to a the competition may generally increase as competitor A's probability of winning the competition decreases. In this way, the prediction game may reward a participant for correctly predicting a victory by an underdog competitor, and the value of correctly predicting a victory by a relatively large underdog (a competitor with a relatively low probability of winning the competition) may be larger than the value of correctly predicting a victory by a smaller underdog.

FIGS. 4A-4B show a schedule 400 that embodies some of the above-described techniques for assigning potential values to predictions. In particular, schedule 400 maps the tournament round in which a competition occurs and the time at which a prediction regarding the competition is made to the potential values of predictions along the path from the specified competition to the final round of the tournament.

Schedule 400 is organized in 10 columns, labeled C1-C10, and 82 rows, labeled R1-R82. As can be seen in column C1 and rows R2-R27, predictions submitted prior to the start of the tournament for competitions in the first, second, third, fourth, fifth, and sixth rounds of the tournament have potential values of 30, 60, 120, 240, 480, and 960 points, respectively. Columns C2-C10 of row R2 show the potential value of submitting a prediction for a first-round competition during the competition, in cases where the prediction affects only that competition and not any subsequent competitions (e.g., the competitor previously predicted to win the first-round competition was not predicted to win any subsequent competitions). In such a case, the potential value of submitting a prediction for the competition ranges from 28 points to 2 points, depending on the status of the competition.

Columns C2-C10 of rows R4-R5 show the potential value of submitting predictions for a path that includes first- and second-round competitions, in a case where the competitor previously predicted to win the first-round competition was also predicted to win the second-round competition, but not any subsequent competitions. In such a case, the potential value of submitting a prediction for the first-round competition during the first-round competition ranges from 27 points to 1 point, depending on the status of the first-round competition, and the potential value of submitting a prediction for the second-round competition during the first round competition is 55 points.

Columns C2-C10 of rows R7-R9 show the potential value of submitting predictions for a path that includes first-, second- and third-round competitions, in a case where the competitor previously predicted to win the first-round competition was also predicted to win the second- and third-round competitions, but not any subsequent competitions. In such a case, the potential value of submitting a prediction for the first-round competition during the first-round competition ranges from 22 points to 1 point, depending on the status of the first-round competition. The potential value of submitting a prediction for the second-round competition during the first round competition is 46 points, and the potential value of submitting a prediction for the third-round competition during the first-round competition is 92 points.

Columns C2-C10 of rows R11-R14 show the potential value of submitting predictions for a path that includes first-, second-, third-, and fourth-round competitions, in a case where the competitor previously predicted to win the first-round competition was also predicted to win the second-, third-, and fourth-round competitions. In such a case, the potential value of submitting a prediction for the first-round competition during the first-round competition ranges from 15 points to 1 point, depending on the status of the first-round competition. The potential values of predictions submitted during the first round competition for the second-, third-, and fourth-round competitions are 31 points, 62 points, and 124 points, respectively.

Columns C2-C10 of rows R16-R20 show the potential value of submitting predictions for a path that includes first-, second-, third-, fourth-, and fifth-round competitions, in a case where the competitor previously predicted to win the first-round competition was also predicted to win the second-, third-, fourth-, and fifth-round competitions. In such a case, the potential value of submitting a prediction for the first-round competition during the first-round competition ranges from 7 points to 0 points, depending on the status of the first-round competition. The potential values of predictions submitted during the first round competition for the second-, third-, fourth-, and fifth-round competitions are 15 points, 30 points, 60 points, and 120 points, respectively.

Columns C2-C10 of rows R22-R27 show the potential value of submitting predictions for a path that includes first-, second-, third-, fourth-, fifth-, and sixth-round competitions, in a case where the competitor previously predicted to win the first-round competition was also predicted to win the second-, third-, fourth-, fifth-, and sixth-round competitions. In such a case, the potential value of submitting a prediction for the first-round competition during the first-round competition ranges from 1 point to 0 points, depending on the status of the first-round competition. The potential values of predictions submitted during the first round competition for the second-, third-, fourth-, fifth-, and sixth-round competitions are 3 points, 6 points, 12 points, 24 points, and 48 points, respectively.

The remainder of schedule 400 shows the potential values of paths in cases where predictions are submitted after the first round but before or during the second round (rows R30-R48), after the second round but before or during the third round (rows R51-R63), after the third round but before or during the fourth round (rows R66-R73), after the fourth round but before or during the fifth round (rows R76-R79), and after the fifth round but before or during the sixth round (row R82). One of ordinary skill in the art will understanding the meanings of the schedule's entries, which are not belabored here.

The potential values illustrated in schedule 400 are non-limiting. Any suitable potential values may be assigned to predictions. In some embodiments, the potential value of predictions for a path through a tournament may decrease each time a prediction on that path is changed. This technique penalizes participants who repeatedly change predictions on the same path.

In some embodiments, the potential value assigned to a prediction may be determined dynamically rather than statically. For example, the potential value of a prediction may be assigned such that the expected value of submitting a new prediction for a competition exceeds the expected value of keeping an existing prediction for the competition when the probability of the current prediction being correct is less than a threshold probability (e.g., 40%, 33%, 30%, 25%, 20%, 10%, or 5%).

Prediction game module 120 may use any suitable technique to determine the probability that one or more of a participant's predictions (e.g., an individual prediction, a specified group of predictions, or a group of predictions corresponding to a specified path through a tournament bracket) are correct. In some embodiments, the probability of a prediction's correctness may be determined based on the status of the competition (e.g., score, time remaining, relative quality of the competitors, etc.), other participants' predictions for the competition (e.g., the percentage of existing predictions in favor of the participant's predicted winner), results of a poll (e.g., a poll of participants, experts, spectators, etc.), and/or any other suitable information. The probability of a participant's predictions for a group of competitions being correct may be determined by combining the probabilities for the individual competitions in the group.

Prediction game module 120 may use any suitable technique to determine the expected value of a participant's prediction. In some embodiments, the expected value of a prediction may be the product of the prediction's maximum potential value and the probability that the prediction is correct.

Prediction game module 120 may use any suitable technique to determine a participant's score. In some embodiments, when a competition ends and the participant's prediction for that competition was correct, prediction game module 120 may add the maximum potential value of the participant's prediction for that competition to the participant's score. In some embodiments, bonus points may be added to the participant's score when the participant satisfies one or more bonus criteria, including, without limitation, using the prediction game software every day for a specified number of consecutive days, correctly predicting something other than the outcome of a competition (e.g., the final score of a competition, the total number of points scored in the competition, etc.), viewing media associated with the underlying tournament, etc. In some embodiments, when a competition ends and the participant's prediction for that competition was incorrect, no points may be added to the participant's score.

Returning to FIG. 1, prediction game data 130 includes data associated with one or more prediction games. In some embodiments, prediction game data 130 includes a prediction game record for each of a set of prediction games, and at least one participant record for each prediction game participant. A prediction game record may include data identifying the participants in a prediction game, the underlying tournament, the game's scoring scheme, the game's scheme for assigning potential values to predictions, the game's scheme for permitting/prohibiting submission of new predictions, etc. A participant record may include data identifying the participant (e.g., a name, username, identifier, avatar, and/or image associated with the participant), the league in which the participant is playing the game (if any), the participant's standing within the league, the participant's score, the participant's predictions, the potential values of the participant's predictions, etc.

Figure 5:
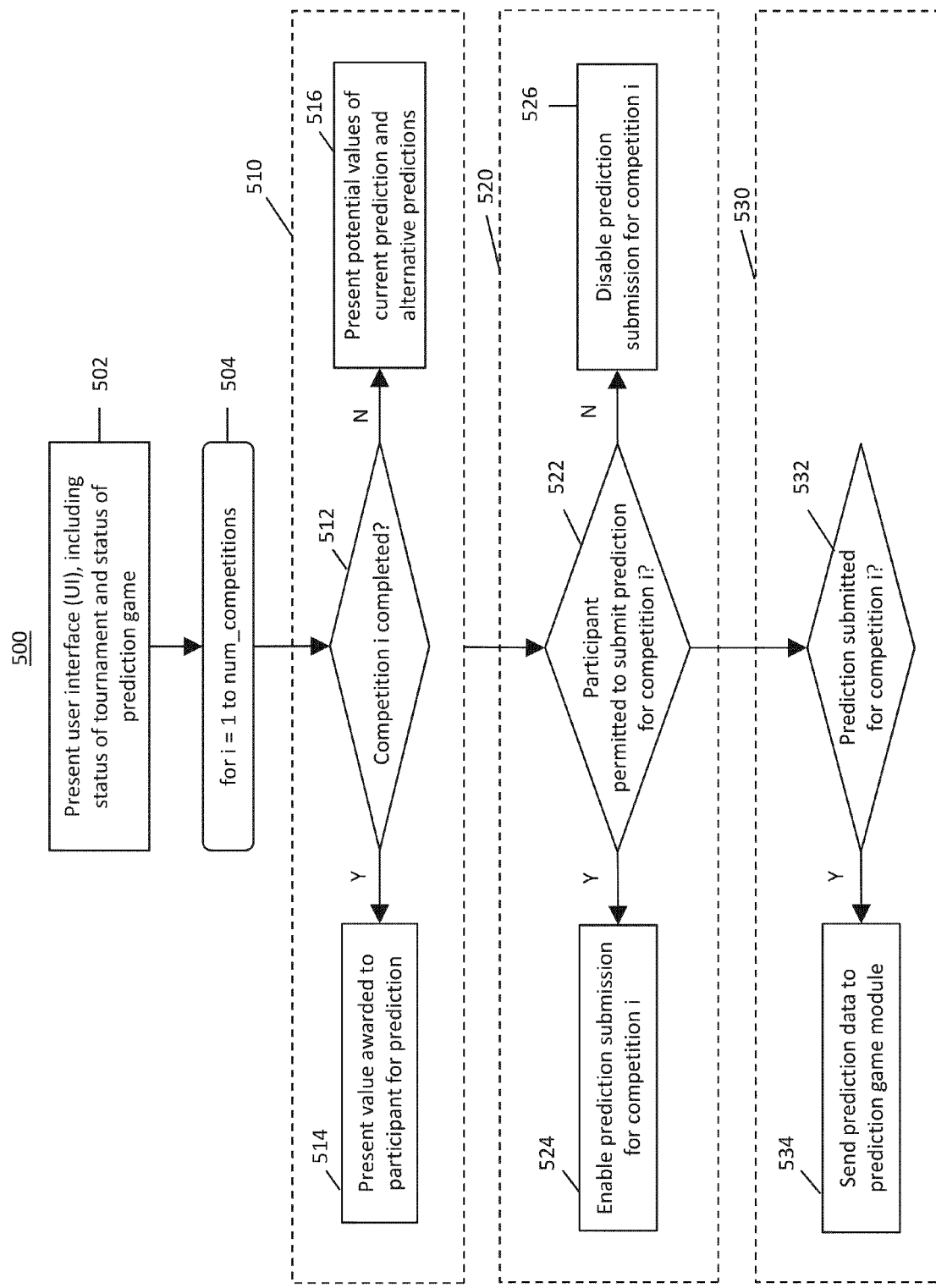
FIG. 5 is a flowchart of a method for presenting a user interface of a prediction game system, in accordance with some embodiments.

FIG. 5 shows a method 500 for presenting a user interface (UI) of a prediction game system, according to some embodiments. In some embodiments, interface module 110 may perform method 500. At step 502, the UI for the prediction game is presented, including the portions of the UI associated with the status of the tournament, the status of the prediction game, and the participant's predictions. At steps 504-534, the participant's predictions and the interface components for submitting new predictions are updated based on prediction game data 130, tournament data 140, and/or inputs received via the interface components.

In particular, loop 504 of method 500 iterates through the tournament's competitions. At step 510, the values of predictions associated with a competition are presented. These values may include the number of points awarded to the participant for correctly predicting the outcome of the competition, the potential value of the participant's current prediction for the competition, and/or the potential value of an alternative prediction for the competition. At step 520, the interface components for submitting a new prediction for the competition are enabled or disabled, as appropriate. At step 530, a new prediction for the current competition may be received and processed.

Step 510 involves presenting the values of predictions associated with a competition. At step 512, a determination is made as to whether the competition has been completed. If so, the number of points awarded to the participant for the participant's prediction regarding the outcome of the competition may be presented (e.g., displayed) in step 514. Otherwise, in step 516, the potential value (e.g., maximum potential value, expected value, etc.) of the participant's prediction for the competition may be presented. In addition or in the alternative, the potential value of submitting an alternative prediction for the competition may be presented. Some embodiments of techniques for determining the potential value of a prediction are described above.

In some embodiments, at step 516, information relating to an alternative prediction's impact on the potential values of predictions corresponding to a path through the tournament bracket may be presented. For example, if the participant has previously predicted that competitor A will win competitions along a path that extends through the first four rounds of the tournament bracket, and the participant is considering submitting a new prediction that competitor A will lose the first-round competition, the presented information may include the potential values of the existing predictions for competitions on that path, and the potential values for new predictions for the competition on that path. Some embodiments of techniques for determining the impact of a new prediction on the potential value of a path are described above.

Step 520 involves enabling or disabling the interface components for submitting a new prediction for a competition. At step 522, a determination is made as to whether the participant is currently permitted to submit a prediction for the competition. If so, the interface components for submitting a prediction for the competition are enabled at step 524. Otherwise, the interface components for submitting a prediction for the competition are disabled at step 526. Any suitable technique may be used to disable the interface components for submitting a prediction, including, without limitation, displaying text or graphics indicating that a prediction may not be submitted, hiding or graying out the interface components, etc. Some embodiments of techniques for determining whether a participant is permitted to submit a prediction for a competition are described above.

Step 530 involves receiving new predictions via the user interface. At step 532, a determination is made as to whether the participant has submitted a new prediction for a competition. If so, the data associated with the new prediction are sent to the prediction game module for further processing at step 534.

In the example of FIG. 5, loop 504 iterates through the tournament's competitions sequentially, and steps 510-530 are performed sequentially for the competition corresponding to each iteration of loop 504. However, some embodiments of method 500 are not limited by the loop structure shown in FIG. 5. Rather, the functions illustrated in steps 504-534 of FIG. 5 may be performed using any suitable technique. In some embodiments, steps 510, 520, and 530 may be performed in parallel during each iteration of loop 504. In some embodiments, steps 510, 520, and 530 may be implemented as separate loops. The separate loops may be performed sequentially or in parallel, and the iterations of each loop may be performed sequentially or in parallel. In some embodiments, the operations depicted as different loops, loop iterations, or steps (510, 520, 530) in FIG. 5 may be implemented in parallel tasks or threads.

Figure 6:
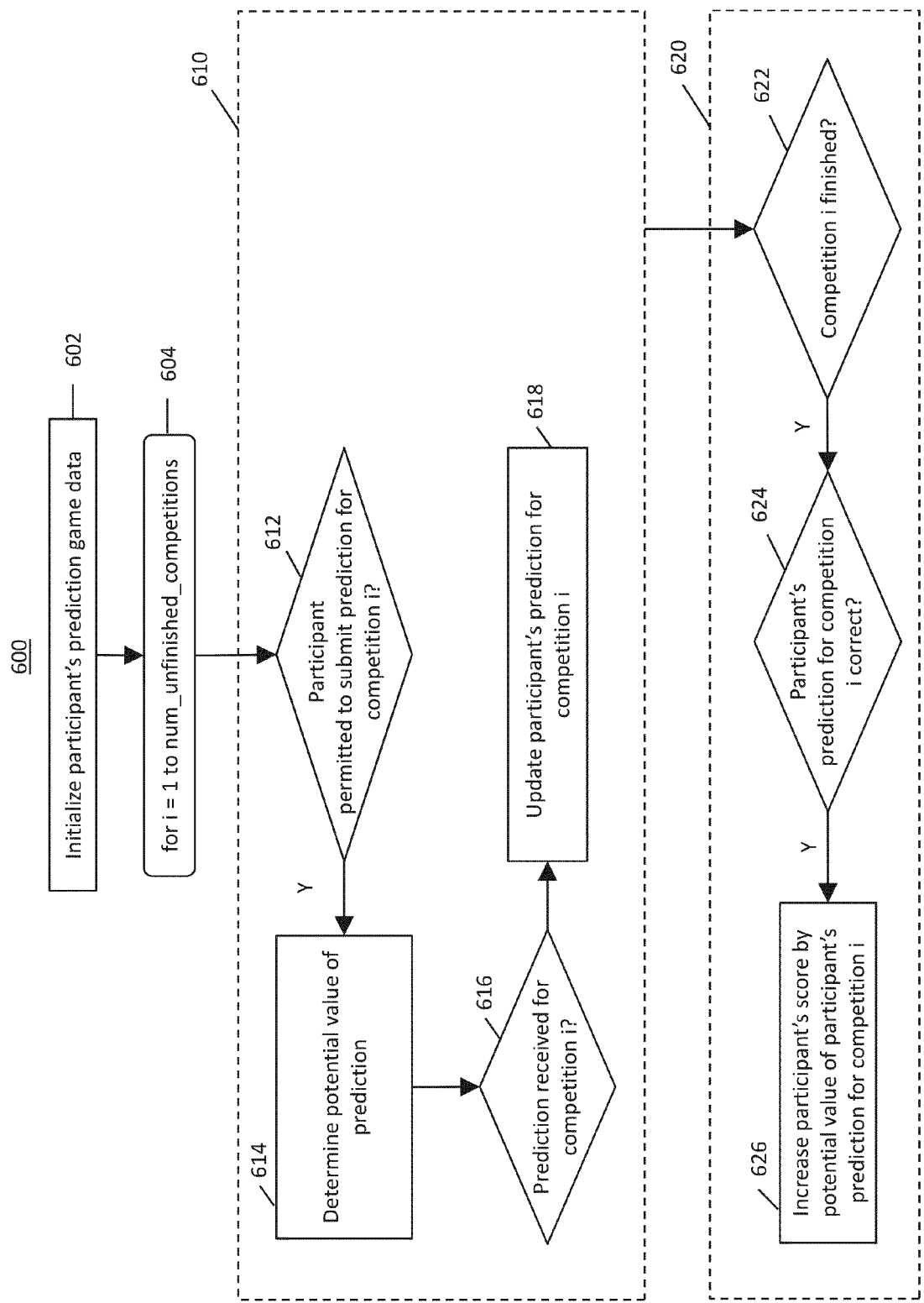
FIG. 6 is a flowchart of a method for administering a prediction game, in accordance with some embodiments.

FIG. 6 illustrates a method 600 for administering a prediction game to a participant, according to some embodiments. At step 602, the data for the prediction game is initialized. Initializing the prediction game data may involve setting the participant's score to an initial value (e.g., zero points), storing the participant's initial predictions for the tournament's competitions, associating a potential value with each of the participant's initial predictions, storing data indicating the type of prediction game being played by the participant (including data indicating any limitations on when the predictions may be provided), etc. At steps 504-526, the participant's score and/or predictions are updated, as appropriate.

In particular, loop 604 iterates through the tournament's unfinished competitions (e.g., competitions that have not yet been completed). At step 610, the potential values of new predictions for unfinished competitions are determined, and the prediction game data is updated to reflect any new predictions received from the participant. At step 620, the participant's score is updated in response to determining that the participant's prediction for a competition is correct.

Step 610 involves determining the potential value of a new prediction for an unfinished competition, and updating the prediction game data in response to receiving a new prediction from the participant. At step 612, a determination is made as to whether the participant is permitted to submit a prediction for the competition (e.g., permitted to submit a prediction now or in the future). If so, steps 614-616 are performed. Some embodiments of techniques for determining whether a participant is permitted to submit a prediction for a competition are described above.

At step 614, the potential value of a prediction is determined. In some embodiments, the potential value is the value of the prediction if submitted at the present time or during the present time period for submitting predictions. In some embodiments, the potential value is the value of the prediction if submitted at the next time or during the next time period when submission of the prediction is permitted. In cases where the competitor currently predicted to win the competition is also predicted to win subsequent competitions, the potential values of new predictions for those subsequent competitions may also be determined. The potential value(s) of the prediction(s) may be stored in the game prediction data and/or sent to interface module 110.

At step 616, a determination is made as to whether a new prediction has been received for the competition. If so, at step 618, the participant's prediction data is updated. The data indicating the participant's prediction for the competition, and the value of that prediction, are updated. In cases where the competitor previously predicted to win the competition was also predicted to win subsequent competitions, the participant's predictions for the subsequent competitions may be voided.

Step 620 involves updating the participant's score. At step 622, a determination is made as to whether a previously unfinished competition has been completed. If so, at step 624, a determination is made as to whether the participant's prediction for that competition was correct. If so, at step 626, the participant's score is increased by the potential value of the participant's prediction for that competition.

In the example of FIG. 6, loop 604 iterates through the tournament's unfinished competitions sequentially, and steps 610-620 are performed sequentially for the competition corresponding to each iteration of loop 604. However, some embodiments of method 600 are not limited by the loop structure shown in FIG. 6. Rather, the functions illustrated in steps 604-626 of FIG. 5 may be performed using any suitable technique. In some embodiments, steps 610 and 620 may be performed in parallel during each iteration of loop 604. In some embodiments, steps 610 and 620 may be implemented as separate loops. The separate loops may be performed sequentially or in parallel, and the iterations of each loop may be performed sequentially or in parallel. In some embodiments, the operations depicted as different loops, loop iterations, or steps (610, 620) in FIG. 6 may be implemented as parallel tasks or threads.

Embodiments have been described in which participants are organized into leagues in which the participants compete against each other in a prediction game. In some embodiments, different participants in the same league may use different settings for the prediction game. For example, some participants may be permitted to submit predictions for a competition during the competition, and other participants may be permitted to submit predictions for a competition after the tournament starts but not during the competition.

Embodiments have been described in which participants make predictions regarding the outcomes of competitions in a tournament. In particular, embodiments have been described in which participants make predictions regarding outcomes in the NCAA Division I Men's Basketball Championship tournament. In some embodiments, participants in the prediction game may make predictions regarding outcomes of any type of competition organized in a bracket-style tournament, including, without limitation, sporting competitions (e.g., soccer, football, basketball, baseball, hockey, wrestling, mixed-martial arts), video game competitions, board game competitions, etc.

Embodiments have been described in which a prediction game system 100 presents a user interface (UI). Presenting the user interface (UI) may involve presenting any suitable sensory stimuli, including, without limitation, visual stimuli (e.g., displaying some or all of the UI), audible stimuli (e.g., playing audio data or synthesizing speech), and/or tactile stimuli (e.g., controlling haptic devices). In some embodiments, portions of the UI may be displayed on a screen of an electronic device. Suitable electronic devices may include, without limitation, smartphones, tablets, laptop computers, desktop computers, smart watches, wearable computers, televisions, etc.).

In some embodiments, the potential value of a participant's prediction for a competition may depend on the time at which the participant's final prediction for the competition was submitted. For example, if the participant initially submits a prediction (with potential value PV1) that competitor A will win the competition, then submits a prediction that competitor B will win the competition (with potential value PV2), then submits another prediction that competitor A will win the competition (with potential value PV3), and competitor A wins the competition, the participant will be awarded PV3 points, not PV1 points.

Figure 7:
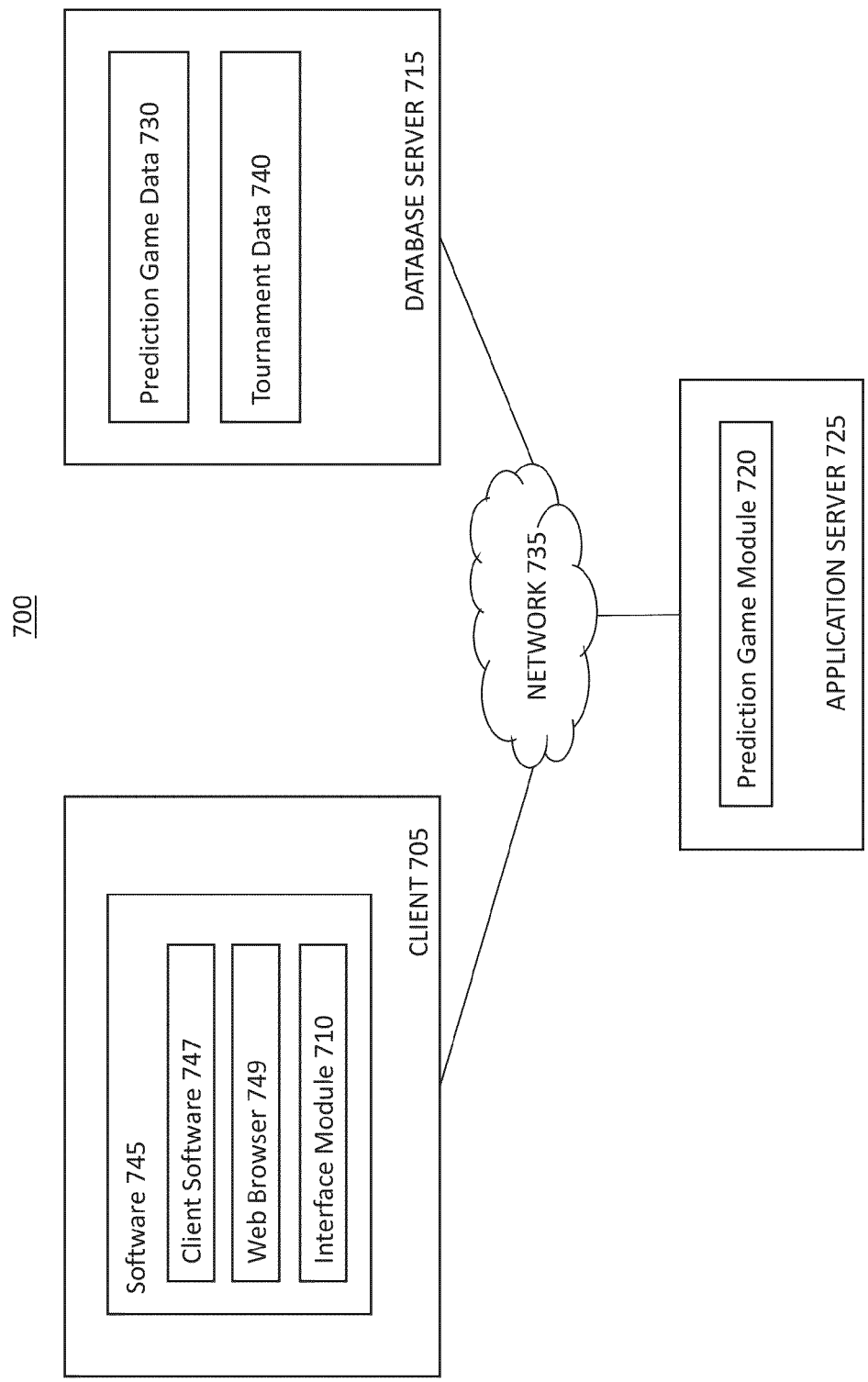
FIG. 7 is a schematic of a system for administering a prediction game, in accordance with some embodiments.

FIG. 7 is a schematic of a system 700 for administering a prediction game, in accordance with some embodiments. In some embodiments, game prediction system 700 includes at least one client computer 705, at least one database server 715, and at least one application server 725. This illustrative configuration is only for exemplary purposes, and it is intended that there can be any number of clients 705 and/or servers 715, 725. In some embodiments, client computer 705 may perform one or more (e.g., all) steps of method 500 for presenting a user interface, and/or may implement an interface module 710. In some embodiments, application server 725 may perform one or more (e.g., all) steps of method 600 for administering a prediction game, and/or may implement a prediction game module 720. In some embodiments, database server 715 may store prediction game data 730 (e.g., organized in prediction game records) and/or tournament data 740 (e.g., organized in tournament records).

One or more communications networks 735 may connect client 705, application server 725, and database server 715. The communication may take place via any media such as standard telephone lines, LAN or WAN links (e.g., T1, T3, 56kb, X.25), broadband connections (ISDN, Frame Relay, ATM), and/or wireless links (IEEE 802.11, Bluetooth). Preferably, the network 735 can carry TCP/IP protocol communications, and requests made by client 705 and the servers 715, 725 (e.g., HTTP/HTTPS requests, JDBC messages, etc.) can be communicated over such TCP/IP networks. The type of network is not a limitation, however, and any suitable network may be used. Non-limiting examples of networks that can serve as or be part of the communications network 735 include a wireless or wired Ethernet-based intranet, a local or wide-area network (LAN or WAN), and/or the global communications network known as the Internet, which may accommodate many different communications media and protocols.

The client 705 is preferably implemented with software 745 running on a client device. In some embodiments, the client device may be a personal computer (e.g., a PC with an INTEL processor or an APPLE MACINTOSH) capable of running such operating systems as the MICROSOFT WINDOWS family of operating systems from Microsoft Corporation of Redmond, Washington, the MACINTOSH operating system from Apple Computer of Cupertino, California, and/or various varieties of Unix, such as SUN SOLARIS from SUN MICROSYSTEMS, and GNU/Linux from RED HAT, INC. of Durham, North Carolina. In addition or in the alternative, client 705 may be implemented on such hardware as a smart or dumb terminal, network computer, wireless device, wireless telephone, information appliance, workstation, minicomputer, mainframe computer, personal data assistant, smart phone, tablet, or other computing device that is operated as a general purpose computer, or a special purpose hardware device used solely for serving as a client 705.

Generally, in some embodiments, clients 705 can be operated and used for various activities including sending and receiving electronic mail and/or instant messages, requesting and viewing content available over the World Wide Web, participating in chat rooms, or performing other tasks commonly done using a computer, handheld device, or cellular telephone. Client 705 can also be operated by users on behalf of others, such as employers, who provide the client 705 to the users as part of their employment.

In various embodiments, the client computer 705 includes client a web browser 749. The web browser 749 allows the client 705 to request a web page or other downloadable program, applet, or document (e.g., from the application server 725) with a web-page request. One example of a web page is a data file that includes computer executable or interpretable information, graphics, sound, text, and/or video, that can be displayed, executed, played, processed, streamed, and/or stored and that can contain links, or pointers, to other web pages. Examples of commercially available web browser software 749 are INTERNET EXPLORER, offered by Microsoft Corporation, NETSCAPE NAVIGATOR, offered by AOL/Time Warner, FIREFOX offered the Mozilla Foundation, or CHROME offered by Google.

In some embodiments, the client 705 includes client software 747. The client software 747 provides, for example, functionality to the client 705 that allows a user to send and receive electronic mail, instant messages, telephone calls, video messages, streaming audio or video, or other content. Examples of client software 747 include, but are not limited to OUTLOOK and OUTLOOK EXPRESS, offered by Microsoft Corporation, THUNDERBIRD, offered by the Mozilla Foundation, and INSTANT MESSENGER, offered by AOL/Time Warner. Not shown are standard components associated with client computers, including a processing device (e.g., central processing unit), volatile and/or non-volatile storage, input/output devices, and/or a display unit.

In some embodiments, web browser software 749 and/or client software 747 may allow the client to access a user interface for a prediction game system. Through the user interface, the client may submit predictions for a prediction game. In response to such a submission, client 705 may transmit the visualization request to application server 725, which may process the new prediction.

The game prediction system 700 may include an interface module 710. In some embodiments, interface module 710 may perform one or more (e.g., all) steps of method 500 for presenting a user interface, and/or may implement some or all of the functionality of interface module 110. In the implementation described herein, the interface module resides on client 705. The interface module be implemented in whole or in part as a software program using any suitable programming language or languages (C++, C#, java, LISP, BASIC, PERL, etc.) and/or as a hardware device (e.g., ASIC, FPGA, processing device, memory, storage, etc.). In some embodiments, at least a portion of interface module 710 may be implemented on client 705.

Application server 725 interacts with the client 705. Server 725 is preferably implemented on one or more server-class computers that have sufficient memory, data storage, and processing power and that run a server-class operating system (e.g., SUN Solaris, GNU/Linux, and the MICROSOFT WINDOWS family of operating systems). System hardware and software other than that specifically described herein may also be used, depending on the capacity of the device and the size of the user base. For example, server 725 may include or may be part of a logical group of one or more servers such as a server farm or server network. As another example, there may be multiple servers 725 associated with or connected to each other, or multiple servers may operate independently, but with shared data. In a further embodiment and as is typical in large-scale systems, application software can be implemented in components, with different components running on different server computers, on the same server, or some combination. In some embodiments, application server 725 may run JEE Application Server software.

The game prediction system 700 may include a prediction game module 720. In some embodiments, prediction game module 720 may perform one or more (e.g., all) steps of method 600 for administering a prediction game, and/or may implement some or all of the functionality of prediction game module 120. In the implementation described herein, the prediction game module resides on application server 725. The interface module be implemented in whole or in part as a software program using any suitable programming language or languages (C++, C#, java, LISP, BASIC, PERL, etc.) and/or as a hardware device (e.g., ASIC, FPGA, processing device, memory, storage, etc.). In some embodiments, at least a portion of prediction game module 720 may be implemented on client 705.

Database server 715 may store prediction game data 730 and/or tournament data 740. The database server may be implemented using, for example, the MySQL Database Server by MySQL AB of Uppsala, Sweden, the PostgreSQL Database Server by the PostgreSQL Global Development Group of Berkeley, CA, or the ORACLE Database Server offered by ORACLE Corp. of Redwood Shores, CA. In some embodiments, at least a portion of prediction game data 730 may be cached or stored on client 705 and/or on server 725. In some embodiments, at least a portion of tournament data 740 may be cached or stored on client 705 and/or on server 725.

Although examples provided herein may have described modules as residing on separate computers or operations as being performed by separate computers, it should be appreciated that the functionality of these components can be implemented on a single computer, or on any larger number of computers in a distributed fashion.

The above-described embodiments may be implemented in any of numerous ways. For example, the embodiments may be implemented using hardware, software or a combination thereof. When implemented in software, the software code can be executed on any suitable processor or collection of processors, whether provided in a single computer or distributed among multiple computers. Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various techniques described above. The computer readable medium or media may be non-transitory. The computer readable medium or media can be transportable, such that the program or programs stored thereon can be loaded onto one or more different computers or other processors to implement various aspects of the present disclosure. The terms "program" or "software" are used herein in a generic sense to refer to any type of computer code or set of computer-executable instructions that can be employed to program a computer or other processor to implement various aspects described in the present disclosure. Additionally, it should be appreciated that according to one aspect of this disclosure, one or more computer programs that when executed perform techniques described in the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish a relationship between data elements.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

In some embodiments, the method(s) described herein may be implemented as computer instructions stored in portions of a computer's random access memory to provide control logic that affects the processes described above. In such an embodiment, the program may be written in any one of a number of high-level languages, such as FORTRAN, PASCAL, C, C++, C#, Java, javascript, Tcl, or BASIC. Further, the program can be written in a script, macro, or functionality embedded in commercially available software, such as EXCEL or VISUAL BASIC. Additionally, the software may be implemented in an assembly language directed to a microprocessor resident on a computer. For example, the software can be implemented in Intel 80x86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

Various aspects of the present disclosure may be used alone, in combination, or in a variety of arrangements not specifically described in the foregoing, and the invention is therefore not limited in its application to the details and arrangement of components set forth in the foregoing description or illustrated in the drawings. For example, aspects described in one embodiment may be combined in any manner with aspects described in other embodiments.

Terminology and Equivalents

The phraseology and terminology used herein is for the purpose of description and should not be regarded as limiting.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. An apparatus for administering a prediction game, the apparatus comprising:
   a memory configured to store processor-executable instructions; and
   a processor configured to execute the processor-executable instructions, wherein executing the processor-executable instructions causes the apparatus to:
   receive, from a client device, a request for potential value to a participant of a prospective selection by the participant of a first competitor as a predicted winner of a first competition in a tournament,
   determine the potential value to the participant of the prospective selection based, at least in part, on a time associated with at least one of (i) the prospective selection and (ii) on occurrence of one or more events prior to the time associated with the prospective selection, and
   sending, to the client device, the determined potential value of the prospective selection.

2. The apparatus of claim 1, wherein determining the potential value of the prospective selection based, at least in part, on the time associated with the prospective selection comprises:
   determining whether the time associated with the prospective selection is after a starting time of the tournament; and
   in response to determining that the time associated with the prospective selection is after the starting time of the tournament, setting the potential value to a first value, wherein the first value is less than a second value associated with making the prospective selection prior to the starting time of the tournament.

3. The apparatus of claim 1, wherein the tournament includes at least a round of competition, wherein the round of competition includes the first competition, and wherein determining the potential value of the prospective selection based, at least in part, on the time associated with the prospective selection comprises: determining whether the time associated with the prospective selection is after a starting time of the round of competition; and
   in response to determining that the time associated with the prospective selection is after the starting time of the round of competition, setting the potential value to a first value, wherein the first value is less than a second value associated with making the prospective selection prior to the starting time of the round of competition.

4. The apparatus of claim 1, wherein determining the potential value of the prospective selection based, at least in part, on the time associated with the prospective selection comprises:
   determining whether the time associated with the prospective selection is after a starting time of the first competition; and
   in response to determining that the time associated with the prospective selection is after the starting time of the first competition, setting the potential value to a first value, wherein the first value is less than a second value associated with making the prospective selection prior to the starting time of the first competition.

5. The apparatus of claim 1, wherein determining the potential value of the prospective selection based, at least in part, on the occurrence of one or more events prior to the time associated with the prospective selection comprises:
   determining whether the time associated with the prospective selection is after the occurrence of the one or more events; and
   in response to determining that the time associated with the prospective selection is after the occurrence of the one or more events, setting the potential value to a first value, wherein the first value is less than a second value associated with making the prospective selection prior to the occurrence of the one or more events.

6. The apparatus of claim 5, wherein the one or more events include at least one of (i) a starting of the tournament, (ii) a starting of a round of competition of the tournament, (iii) a starting of the first competition, (iv) a starting of a timeout, a starting of a period of the first competition, and (v) a starting of a halftime break in the competition.

* * * * *